United States Patent
Kobuchi et al.

[11] Patent Number: 6,165,392
[45] Date of Patent: Dec. 26, 2000

[54] METHOD AND APPARATUS FOR MANUFACTURING LENSES AND A LENS MANUFACTURED THEREBY

[75] Inventors: Nobuyuki Kobuchi; Masahiko Okamoto, both of Osaka, Japan

[73] Assignee: Yamamoto Kogaku Kabushiki Kaisha, Osaka, Japan

[21] Appl. No.: 09/250,727

[22] Filed: Feb. 16, 1999

[30] Foreign Application Priority Data

Mar. 2, 1998 [JP] Japan .................................. 10-049707

[51] Int. Cl.⁷ .................................................. B29D 11/00
[52] U.S. Cl. .......................... 264/1.7; 264/1.32; 264/511; 264/571; 425/117; 425/388; 425/808
[58] Field of Search .............................. 264/1.7, 1.1, 511, 264/571, 510, 513, 553, 544, 554, 1.32; 425/808, 117, 110, 542, 388

[56] References Cited

U.S. PATENT DOCUMENTS

| | | | |
|---|---|---|---|
| 4,950,445 | 8/1990 | Salce et al. | 264/553 |
| 4,985,186 | 1/1991 | Nose et al. | 264/335 |
| 5,494,615 | 2/1996 | Wang Lee | 264/1.7 |
| 5,620,635 | 4/1997 | DeRozier et al. | 425/808 |
| 5,800,744 | 9/1998 | Munakata | 264/1.7 |

FOREIGN PATENT DOCUMENTS

60-205401  10/1985  Japan .
61-56090   12/1986  Japan .

*Primary Examiner*—Mathieu D. Vargot
*Attorney, Agent, or Firm*—Oblon, Spivak, McClelland, Maier & Neustadt, P.C.

[57] ABSTRACT

A method of manufacturing a lens having a lens body integral with a functional sheet on one side thereof, includes an insert molding process including the steps of: placing the functional sheet as an insert in position in a mold defining a suction hole therein; and while attracting the functional sheet against a molding surface of the mold by a peripheral portion thereof by suction through the suction hole, supplying to the mold a molten plastic material for forming the lens body, to form the lens.

13 Claims, 6 Drawing Sheets

METHOD AND APPARATUS FOR MANUFACTURING LENSES AND A LENS MANUFACTURED THEREBY

BACKGROUND OF THE INVENTION

1. Field of the Invention

The present invention relates to method and apparatus for manufacturing a lens having a lens body integral with a functional sheet, such as a polarizing sheet or an optical sheet for controlling the light transmission of the lens, on one side thereof by an insert molding process in which the functional sheet is inserted in a mold, and to a lens manufactured thereby.

2. Description of the Related Art

Figure 8:
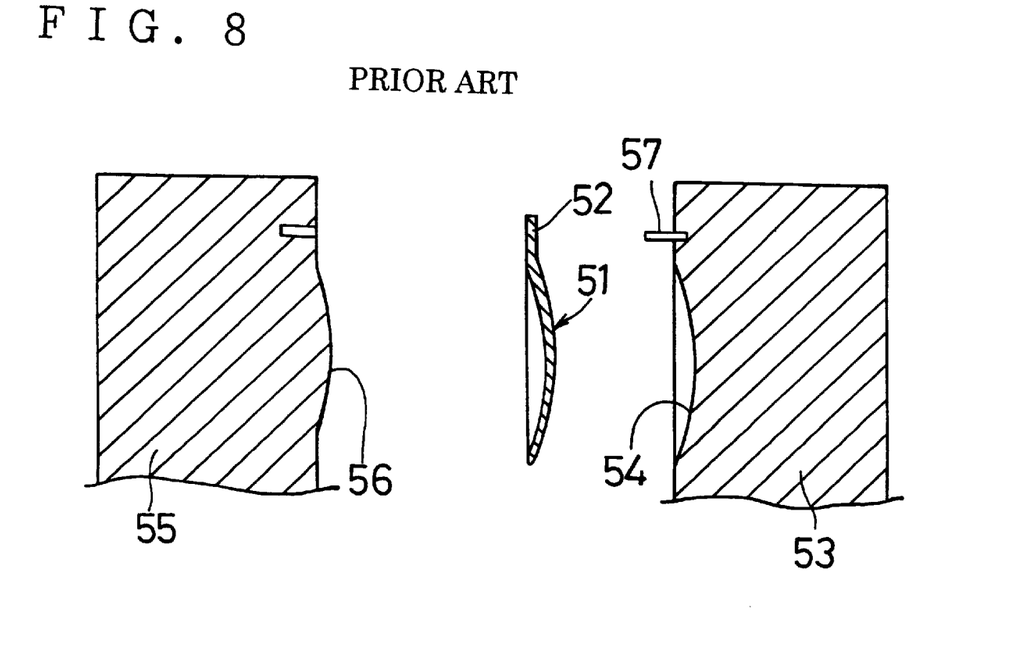
FIG. 8 is a sectional view showing a conventional mold for manufacturing a lens.

A method of manufacturing a lens is known which comprises an insert molding process including the steps of inserting into a mold a polarizing sheet previously formed into a curved surface, and then injecting a molten plastic material into the mold, thereby integrally molding a lens body and the polarizing sheet (refer to, for example, Japanese Examined Patent Publication No. SHO 61-56090). According to this conventional art, a flat peripheral portion around a curved surface portion of preformed polarizing sheet 51 is cut off with a portion retained as a support portion 52 as shown in FIG. 8; a support pin 57 is provided on a concave mold part 53 in an area outside a concave molding surface 54 thereof or on a convex mold part 55 in an area outside a convex molding surface thereof; the polarizing sheet 51 is gently placed on the concave molding surface 54 or the convex molding surface 56 conformably while the support portion 52 is supported by the support pin 57; and the mold parts 53 and 55 are clamped together and a molten plastic material is filled into a resulting cavity to form a lens having a lens body integral with the polarizing sheet 51.

It is said that, since the curved surface portion of the polarizing sheet 51 becomes in contact with the concave molding surface 54 of the concave mold part 53 (or the convex molding surface 56 of the convex mold part 55) with a slight play in the cavity though the support portion 52 of the polarizing sheet 51 is pinched between the mold parts 53 and 55, the molten plastic material entering the cavity is not substantially resisted by the polarizing sheet 51 and hence smoothly covers the polarizing sheet 51, resulting in a lens having a lens body free of any wrinkle and the polarizing sheet 51 with no crack.

With this method, however, at least an additional process of cutting off the support portion 52 by grinding is required even if the lens integrally having the polarizing sheet 51 can be used without being trimmed, thus resulting in the manufacture requiring additional time and labor. Further, since the polarizing sheet 51 between the mold parts 53 and 55 is anchored at the support portion 52 only, a peripheral portion of the polarizing sheet 51 is likely to be easily turned up by the inflow pressure of the plastic material or the like, so that the molten plastic material reaches the outward side of the polarizing sheet 51. This results in the polarizing sheet 51 or lens having deteriorated functions, hence, in a difficulty in manufacturing lenses of good quality.

Figure 9:
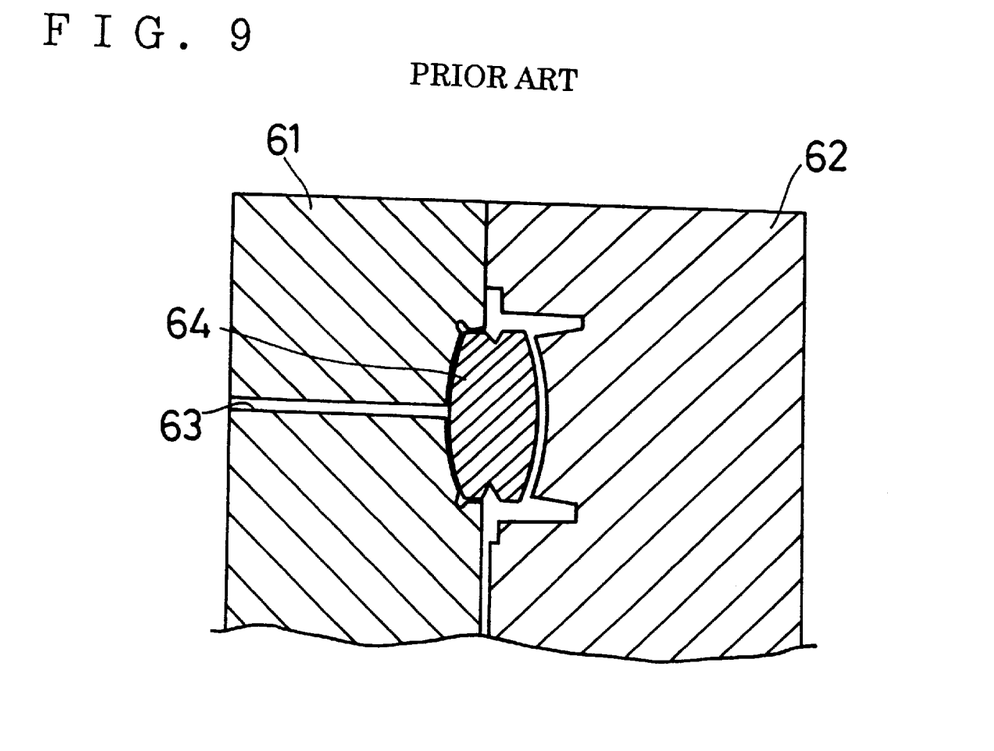
FIG. 9 is a sectional view showing another conventional mold for manufacturing a lens.

In the insert molding process the art of anchoring the insert to a predetermined position by suction developed by a vacuum creating device is known. A lens manufacturing method based on the insert molding process utilizing such art is also known from, for example, Japanese Unexamined Patent Publication No. SHO 60-205401. According to this conventional method, mold parts 61 and 62, one of which defines a suction hole 63 opening at the center of the bottom thereof, are used as shown in FIG. 9; a previously formed first lens 64 is placed in position between the mold parts 61 and 62; a vacuum pump is actuated to attract the first lens 64 against the mold part 61 through the suction hole 63 to anchor the first lens 64 onto the mold part 61; and the other mold part 62 is mated with the mold part 61, followed by injection of a molten plastic material into the resulting cavity to afford an intended hybrid lens.

This conventional art does not require the grinding process which is required after the insert molding in the former conventional art shown in FIG. 8. However, since a central portion of the first lens 64 is attracted by a large suction force though the suction hole 63 defined centrally of the mold part 61 and connected to the vacuum pump, a relatively large suction mark will result in a central portion of a functional sheet such as a polarizing sheet, if the functional sheet is used as an insert instead of the first lens 64. This significantly deteriorates the functions of the functional sheet or lens to the extent that it is difficult to make correction after the insert molding. Additionally, the provision of the suction hole 63 in the central portion of the mold part 61 may cause a similar problem as in the former conventional art shown in FIG. 8; that is, a peripheral portion of the polarizing sheet 51 is likely to be easily turned up by the inflow pressure of the plastic material or the like, so that the molten plastic material reaches the outward side of the polarizing sheet 51, thus resulting in the polarizing sheet 51 or lens having deteriorated functions.

In view of the foregoing problems involved in the prior art, it is an object of the present invention to provide lens manufacturing method and apparatus which can securely hold an insert such as a functional sheet on a molding surface of a mold in an insert molding process without any danger of turning up a peripheral portion of the functional sheet and can easily manufacture a lens of good quality without any substantial deterioration in the functions of the functional sheet or lens.

SUMMARY OF THE INVENTION

To attain the above object, the present invention provides a method of manufacturing a lens having a lens body integral with a functional sheet on one side thereof, comprising an insert molding process including the steps of: placing the functional sheet as an insert in position in a mold defining a suction hole therein; and while attracting the functional sheet against a molding surface of the mold by a peripheral portion thereof by suction through the suction hole, supplying to the mold a molten plastic material for forming the lens body, to form the lens.

According to this method, the functional sheet (or the insert) is attracted and held against the molding surface by a peripheral portion thereof by suction through the suction hole and, hence, the peripheral portion of the functional sheet is prevented from being turned up from the molding surface of the mold. Further, since a mark of the suction hole which results from the suction therethrough is formed in the peripheral portion of the functional sheet, such a suction mark scarcely deteriorates the functions of the functional sheet or lens.

The present invention yet provides a method of manufacturing a lens having a lens body integral with a functional sheet on one side thereof, comprising an insert molding process including the steps of: placing the functional sheet as an insert in position between a concave molding surface of a concave mold part of a mold and a convex molding surface of a convex mold part of the mold, the concave molding surface having a curvature equal to a curvature of the lens, the convex molding surface having a curvature equal to a curvature of the lens, one of the concave mold part and the convex mold part defining a plurality of suction holes therein; and while attracting the functional sheet against the molding surface of said one of the concave mold part and the convex mold part by a peripheral portion thereof by suction through the plurality of suction holes, supplying into a cavity defined between the concave molding surface of the concave mold part and the convex molding surface of the convex mold part a molten plastic material for forming the lens body, to form the lens.

With this method, the functional sheet (or the insert) is attracted and held against the concave molding surface of the concave mold part or the convex molding surface of the convex mold part by the peripheral portion thereof by suction through the plurality of suction holes and, hence, the peripheral portion of the functional sheet is prevented from being turned up from the molding surface of one of the concave mold part and the convex mold part at plural points in the insert molding process. Further, since marks of the suction holes which result from the suction therethrough are formed in the peripheral portion of the functional sheet and since each suction mark can be minimized in size by virtue of the provision of the plurality of suction holes, such suction marks scarcely deteriorate the functions of the functional sheet or lens.

In the foregoing methods, the functional sheet to be placed in position in the mold may be previously shaped to match the configuration of the lens body.

The suction hole or the plurality of suction holes may be located in a portion of the molding surface within 10 mm inwardly from a line corresponding in location to a peripheral edge of the lens. This feature allows the suction mark(s) to be formed in the peripheral portion of the functional sheet within 10 mm inwardly from the peripheral edge of the lens. Thus, the functional sheet or the lens can more reliably be prevented from being deteriorated in their functions. In addition, the peripheral portion of the functional sheet can more assuredly be prevented from being turned up from the molding surface of the mold.

Preferably, the plurality of suction holes open the concave molding surface of the concave mold part.

The suction hole or each of the plurality of suction holes preferably defines an opening having a diameter of about 0.1 to about 1.0 mm in the molding surface. This enables each resulting suction mark on the functional sheet to have a size of about 0.1 to about 1.0 mm. Thus, the functional sheet or the lens is more assuredly prevented from being deteriorated in their functions.

The mold is preferably provided with an O-ring between mold components thereof for preventing outside air from entering the suction hole(s). Thus, an unexpected decrease in the suction force can be avoided.

The present invention further provides apparatus for manufacturing a lens having a lens body integral with a functional sheet on one side thereof, the apparatus comprising a mold for performing an insert molding process to form the lens, wherein: the mold has a molding surface for receiving the functional sheet as an insert in position and a molten plastic material for forming the lens body; and a suction hole is defined in the mold for attracting the functional sheet against the molding surface by a peripheral portion of the functional sheet by suction therethrough.

With this construction, the peripheral portion of the functional sheet is prevented from being turned up from the molding surface of the mold in the insert molding process. Further, it is possible to locate a suction mark resulting from the suction through the suction hole in the peripheral portion of the functional sheet. The suction mark in such location scarcely deteriorates the functions of the functional sheet or lens.

The present invention still provides apparatus for manufacturing a lens having a lens body integral with a functional sheet on one side thereof, the apparatus comprising a mold for performing an insert molding process to form the lens, the mold including a concave mold part having a concave molding surface, and a convex mold part having a convex molding surface, wherein: the concave molding surface has a curvature equal to a curvature of the lens, while the convex molding surface has a curvature equal to a curvature of the lens; one of the concave molding surface and the convex molding surface is configured to receive the functional sheet as an insert in position; one of the concave mold part and the convex mold part defines a plurality of suction holes therein for attracting the functional sheet against said one of the concave molding surface and the convex molding surface by a peripheral portion of the functional sheet by suction therethrough; and the concave molding surface and the convex molding surface together define a cavity therebetween for receiving a molten plastic material for forming the lens body.

With this construction, the peripheral portion of the functional sheet is prevented at plural points from being turned up from the molding surface. Further, it is possible to minimize in size each suction mark to be formed in the peripheral portion of the functional sheet. Such small suction marks in the peripheral portion of the functional sheet scarcely deteriorate the functions of the functional sheet or lens.

The present invention still further provides a lens comprising a lens body, and a functional sheet formed integrally with the lens body on one side thereof by an insert molding process, the functional sheet having a plurality of suction marks in a peripheral portion thereof resulting from attraction of the functional sheet against a molding surface of a mold by suction in the insert molding process.

Since this lens is manufactured by the insert molding process in which the functional sheet as an insert is attracted at plural points by the peripheral portion thereof against the molding surface of the mold by suction, the peripheral portion of the functional sheet is prevented from being turned up from the molding surface in the insert molding. Further, the suction marks are not formed in the central portion but in the peripheral portion of the functional sheet, thus resulting in the lens of good quality with its functions scarcely deteriorated by such suction marks.

The foregoing and other objects, features and attendant advantages of the present invention will be more fully appreciated from the following detailed description to be read in conjunction with the accompanying drawings.

DETAILED DESCRIPTION OF THE PREFERRED EMBODIMENTS

The present invention will now be described in detail with reference to the attached drawings.

Figure 2:
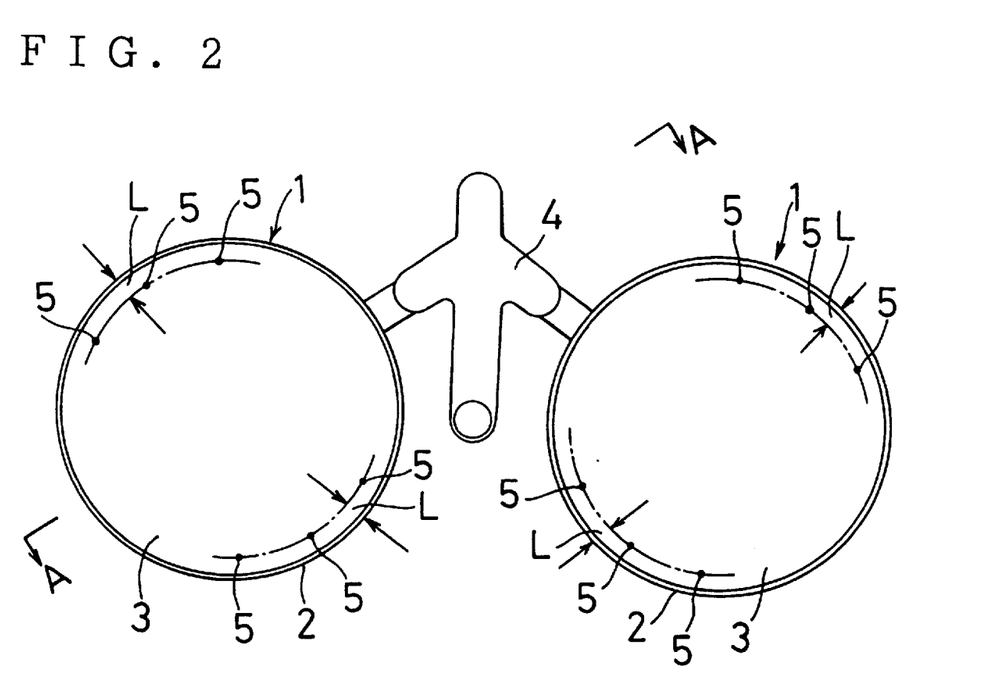
FIG. 2 is a front elevational view of lenses manufactured by an insert molding process using the molding apparatus.
Figure 3:
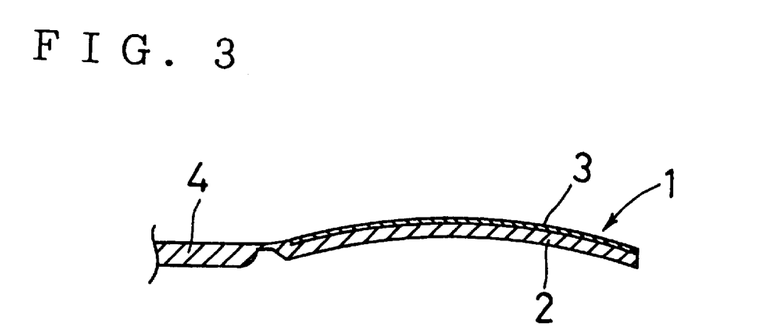
FIG. 3 is a sectional view taken on line A—A of FIG. 2.
Figure 4:
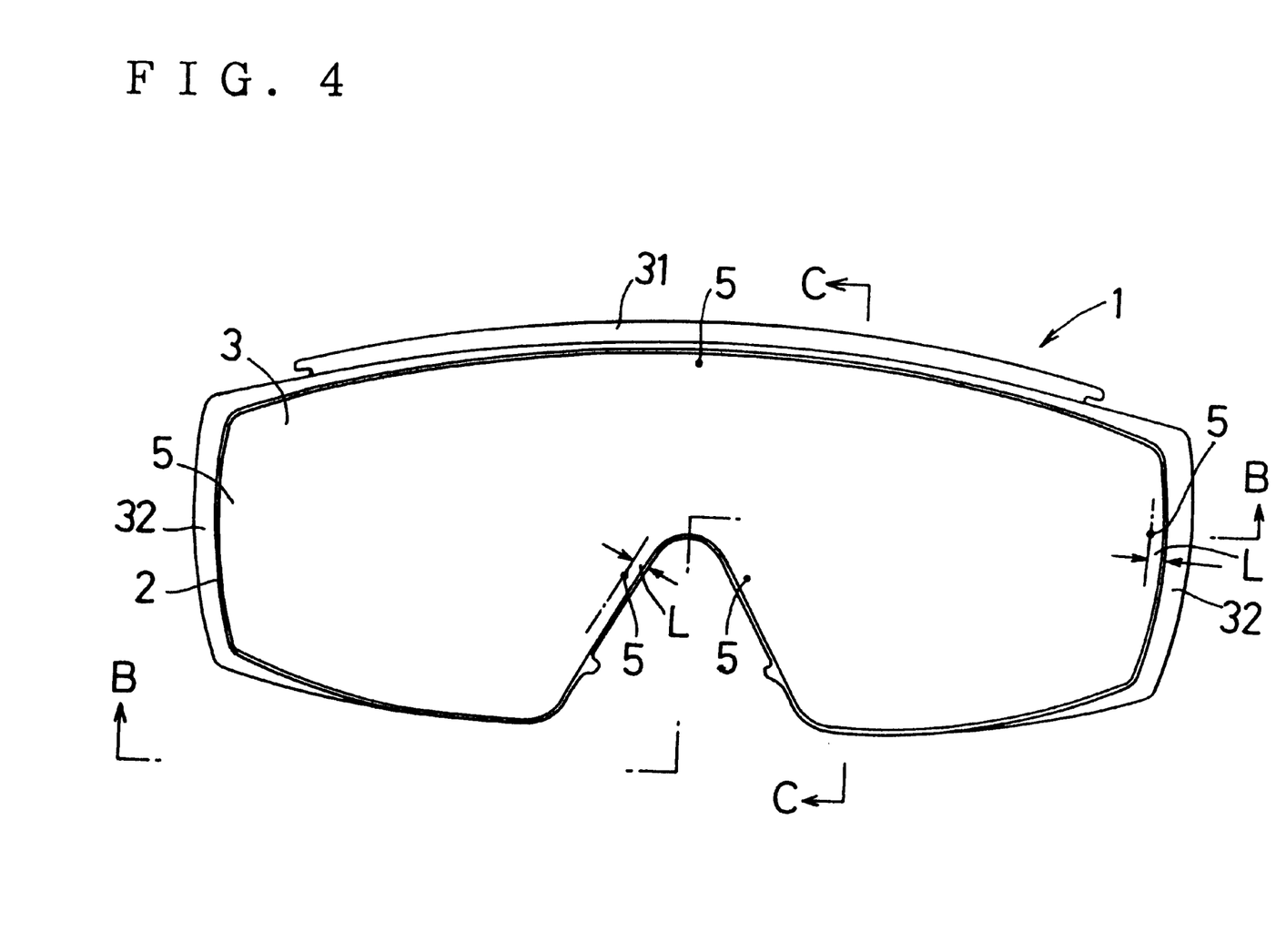
FIG. 4 is a front elevational view showing another embodiment of a lens according to the present invention.
Figure 5:
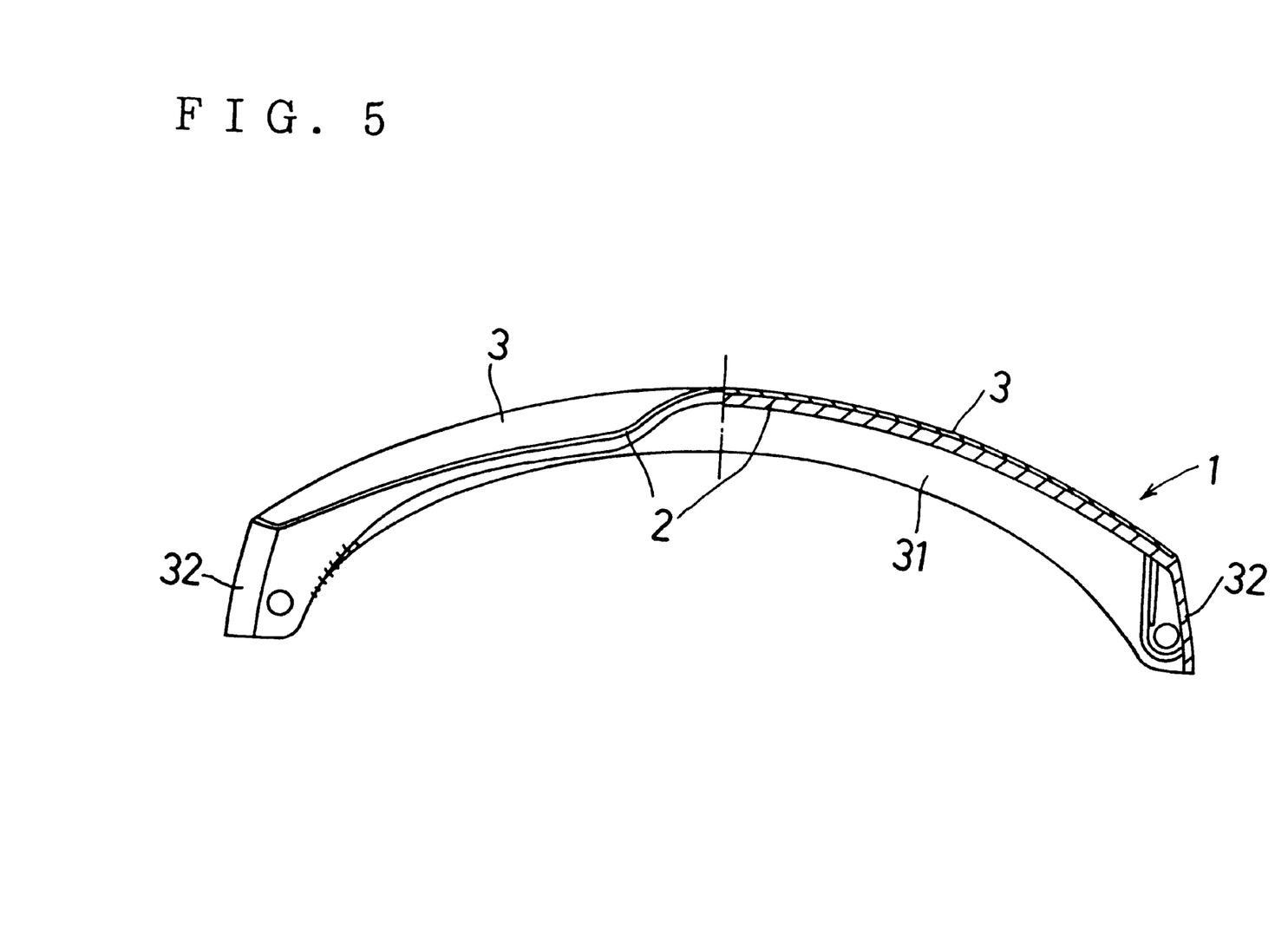
FIG. 5 is a sectional view taken on line B—B of FIG. 4.
Figure 6:
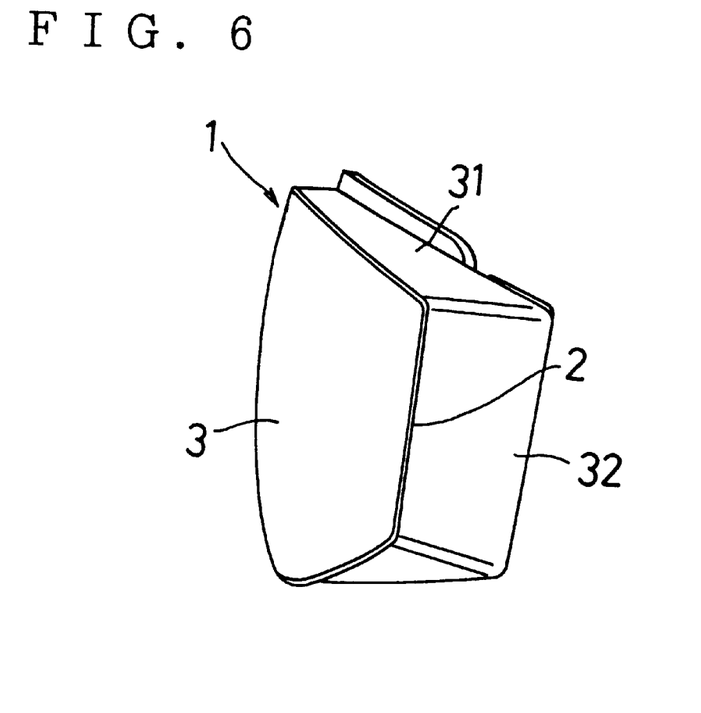
FIG. 6 is a side elevational view of the lens shown in FIG. 4.
Figure 7:
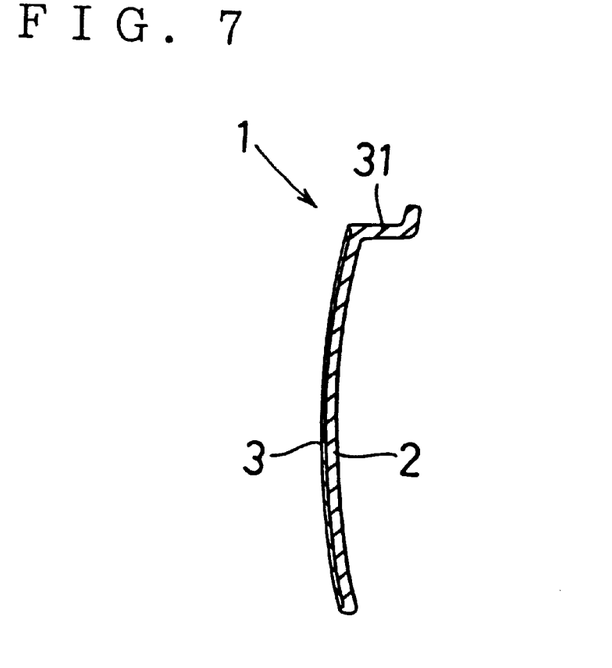
FIG. 7 is a sectional view taken on line C—C of FIG. 4.

Referring to FIGS. 2 and 3 showing lenses manufactured by lens manufacturing method and apparatus of the present invention, a pair of lenses 1 each have a lens body 2 formed of a plastic material and a polarizing sheet 3, as a functional sheet, integral with the lens body 2 on the front side (the convex side) of the lens body 2. The pair of lenses 1 are interconnected through a connection member 4 which is formed integrally with the lens bodies 2 using the same plastic material as the lens bodies 2 by molding. The functional sheet 3 has a peripheral portion formed with a plurality of suction marks 5 slightly projecting forward. These suction marks 5 result from suction through suction holes 23 defined in a mold to be described later. The connection member 4 is cut off from the pair of lens bodies 2 to separate the lenses 1 from each other at an appropriate step following the molding process.

Figure 1:
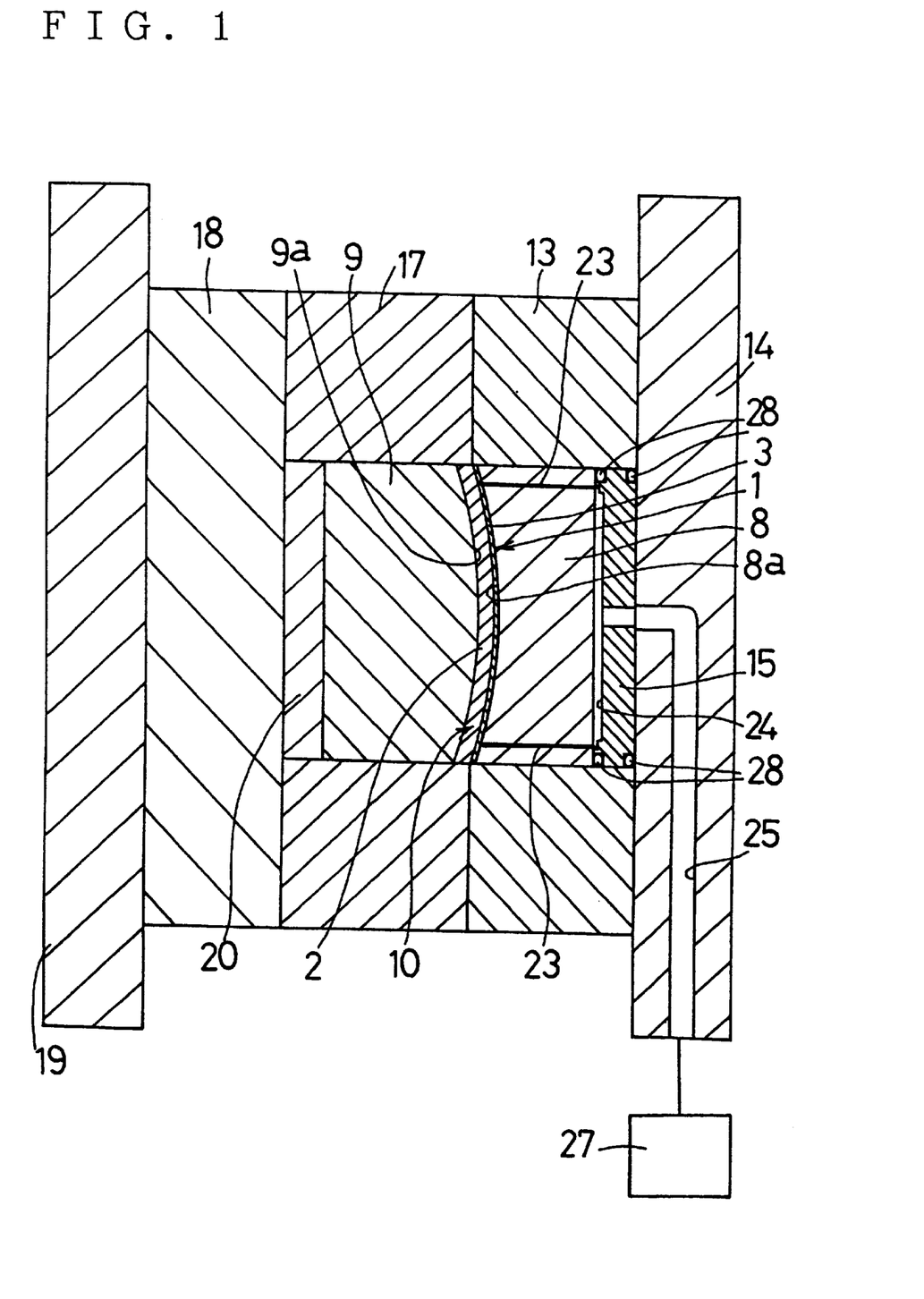
FIG. 1 is a sectional view showing an embodiment of a lens molding apparatus according to the present invention.

Referring to FIG. 1, lens manufacturing apparatus (molding apparatus) for insert-molding the lens 1 includes a concave mold part 8 and a convex mold part 9. The concave mold part 8 has a concave molding surface 8a having a curvature equal to that of the corresponding side of the lens 1, while the convex mold part 9 has a convex molding surface 9a having a curvature equal to that of the corresponding side of the lens 1. A cavity 10 is defined between these molding surfaces 8a and 9a.

The concave mold part 8 is fitted in and held by an annular holding member 13, which in turn is secured to a fixing plate 14 by a fastening member not shown. A spacer 15 is provided between the fixing member 14 and the concave mold part 8. On the other hand, the convex mold part 9 is fitted in and held by an annular holding member 17, which in turn is secured to a movable plate 19 with an intervening member 18 therebetween by a fastening member not shown. A spacer 20 is provided between the movable plate 19 and the convex mold part 9. The convex mold part 9 is movable toward and away from the concave mold part 8 together with the movable plate 19, intervening member 18, holding member 17 and spacer 20 by a hydraulic mechanism not shown.

The concave mold part 8 defines a plurality of suction holes 23 in a portion thereof corresponding in location to a peripheral portion of the lens 1 to be molded. These suction holes 23 are spaced apart from each adjacent one and located within 10 mm inwardly from a line corresponding in location to a peripheral edge of the lens 1. The six suction marks 5 on the polarizing sheet 3 of each lens 1 shown in FIG. 2 are formed by suction through these suction holes 23. Thus, in this embodiment there are six suction holes 23 in a portion of the concave mold part 8 corresponding in location to the peripheral portion of the functional sheet, which suction holes 23 are circumferentially spaced apart from each adjacent one and located within a distance L of 10 mm inwardly from a line corresponding in location to the peripheral edge of the lens 1.

Each suction hole 23 opens in the concave molding surface 8a of the concave mold part 8 for holding the polarizing sheet 3 or the insert by the peripheral portion thereof by suction therethrough. The opening of each suction hole 23 in the concave molding surface 8a has a diameter of about 0.1 to about 1.0 mm.

The spacer 15 defines a suction hole 24 communicating with the suction holes 23, which suction hole 24 also communicates with a suction hole 25 extending through the fixing plate 14. Air is sucked by a vacuum pump 27 through the suction holes 25, 24 and 23 to attract the polarizing sheet 3 against the molding surface 8a of the concave mold part 8. O-rings 28 are respectively provided among the spacer 15, the concave mold part 8 and the holding member 13 and among the spacer 15, the fixing plate 14 and the holding member 13.

The lens 1 is manufactured by the following method.

Initially, the convex mold part 9 is separated from the concave mold part 8, and then an insert, or polarizing sheet 3 previously shaped to match the configuration of the lens body 2 is placed into a predetermined position between the concave mold part 8 and the convex mold part 9 by a position control mechanism not shown. Subsequently, the polarizing sheet 3 is attracted and held against the concave molding surface 8a by the peripheral portion thereof by actuating the vacuum pump 27 to perform suction through the plurality of suction holes 23.

In turn, the convex mold part 9, together with the movable plate 19 and the like, is moved toward and pressed against the concave mold part 8. Subsequently, a molten plastic material for forming the lens body 2 is supplied into resulting cavity 10 defined between the mold parts 8 and 9 through gate and liner not shown to insert-mold the lens 1 having the lens body 2 integral with the polarizing sheet 3 on one side thereof. This insert molding process produces a pair of lenses 1 interconnected through connection member 4 each having lens body 2 integral with polarizing sheet 3 on one side thereof as shown in FIG. 2. The connection member 4 is then cut off from the lens bodies 2 by grinding to give a pair of lenses 1 each having the lens body 2 integral with the polarizing sheet 3 on the front side thereof.

In the insert molding of the lens 1 the attraction of the polarizing sheet 3 against the concave molding surface 8a by suction through the plurality of suction holes 23 causes a plurality of forwardly projecting suction marks 5 to be formed on the polarizing sheet 3 as shown in FIG. 2. Since the plurality of suction holes 23 are provided as spaced apart from each adjacent one in a portion of the concave molding surface 8a which corresponds in location to the peripheral portion of the polarizing sheet 3, the whole suction force required to adequately attracting the polarizing sheet 3 is divided and, hence, the suction force for each suction hole 23 can be reduced. Further, since the diameter of the opening of each suction hole 23 in the concave molding surface 8a is as small as about 0.1 to about 1.0 mm, each suction mark 5 formed by such a small opening can be minimized in size. In addition, it is possible to locate the suction marks 5 in the peripheral portion of the functional sheet 3 and, hence, such suction marks 5 scarcely deteriorate the functions of the functional sheet 3 or lens 1.

Further, the peripheral portion of the functional sheet 3 is attracted against the concave molding surface 8a at plural points through the plurality of suction holes 23 and hence is effectively prevented from being turned up in the insert molding process. Turning-up of the peripheral portion of the functional sheet 3 would undesirably allows the molten plastic material to penetrate between the functional sheet 3 and the concave molding surface 8a of the concave mold part 8 and reach the front side (the outward side) of the functional sheet 3 thereby deteriorating the functions of the functional sheet 3 or lens 1. Such a problem can assuredly be prevented by the method and apparatus of the present invention.

Although this embodiment produces the pair of single-type lenses 1 which are separated from each other after the molding, the present invention is applicable to lenses of the integral type in which a pair of right and left lenses are indiscretely formed as shown in FIGS. 4–7, and to the manufacture thereof.

Specifically, the lens 1 shown in FIGS. 4–7 includes an integral lens body 2 for both right and left eyes and a polarizing sheet 3 for both the right and left eyes which is integral with the lens body 2 on the front side of the lens body 2. The peripheral portion of the lens body 2 is formed integrally with rearwardly protruding upper edge wall 31 and side edge wall 32. In the peripheral portion of the functional sheet 3 are formed a plurality of forwardly projecting, spaced-apart suction marks 5.

This integral type lens 1 is a product insert-molded by a molding apparatus (not shown) which is similar to the foregoing embodiment except for the configuration of each molding surface. As in the foregoing embodiment, the integral type lens 1 is molded by the steps of: placing the polarizing sheet 3 in position between concave molding surface 8a of concave mold part 8 and convex molding surface 9a of convex mold part 9, the curvature of the concave molding surface 8a being equal to that of the corresponding side of the lens to be formed, the curvature of the convex molding surface 9a being equal to that of the corresponding side of the lens; and while attracting the polarizing sheet 3 against the concave molding surface 8a by a peripheral portion thereof by suction through a plurality of suction holes 23 defined in the concave mold part 8, supplying into a cavity defined between the molding surfaces 8a and 9a a molten plastic material for forming the lens body 2, to form the lens 1 having the lens body 2 integral with the polarizing sheet 3 on one side thereof and with the upper edge wall 31 and the side edge wall 32.

Although the concave mold part 8 defines therein the suction holes 23 for attracting the polarizing sheet 3 against the concave molding surface 8a in the foregoing embodiments, instead, it is possible to provide a plurality of suction holes 23 in the convex mold part 9 for attracting the polarizing sheet 3 against the convex molding surface 9a to form a lens having a lens body 2 integral with the polarizing sheet 3 on the rear side thereof.

Further, instead of polarizing sheet 3 used as the functional sheet in the foregoing embodiments, it is possible to use an optical sheet for controlling the transmission of light or a like functional sheet.

As an alternative to the provision of a plurality of suction holes 23 opening in the molding surface of the mold, it is possible to provide only a single suction hole 23 in the mold for attracting the functional sheet 3 against the molding surface of the mold by a peripheral portion thereof. In this case, a concave groove configured to extend along the peripheral portion of the functional sheet 3 and communicating with the single suction hole 23 may be provided in the molding surface for attracting the peripheral portion of the functional sheet 3 against the molding surface of the mold through the concave groove.

Alternatively, it is also possible that a plurality of suction holes 23 are provided in a portion of the molding surface corresponding in location to a peripheral portion of the functional sheet 3, and a concave groove communicating with the plurality of suction holes 23 and configured to extend along the peripheral portion of the functional sheet 3 is provided in the molding surface for attracting the functional sheet 3 against the molding surface by the peripheral portion thereof by suction.

While the presently preferred embodiments of the present invention have been described in detail, as will be apparent with those familiar with the art, various variations and modifications can be made in embodiments without departing from the scope of the invention defined by the following claims.

What is claimed is:

1. A method of manufacturing a lens having a lens body integral with a functional sheet on one side thereof, comprising an insert molding process including the steps of:

placing the functional sheet as an insert in position in a mold including a suction hole therein;

applying suction force sufficient to hold the functional sheet through the suction hole such that the functional sheet is held against a molding surface of the mold by a peripheral portion of the functional sheet; and while holding the functional sheet against the molding surface by the peripheral portion of the functional sheet, supplying to the mold a molten plastic material for forming the lens body, thereby forming the lens.

2. A method of manufacturing a lens having a lens body integral with a functional sheet on one side thereof, comprising an insert molding process including the steps of:

placing the functional sheet as an insert in position between a concave molding surface of a concave mold part of a mold and a convex molding surface of a convex mold part of the mold, the concave molding surface having a curvature equal to a curvature of the lens, the convex molding surface having a curvature equal to a curvature of the lens, one of the concave mold part and the convex mold part including a plurality of suction holes therein;

applying suction force sufficient to hold the functional sheet through the plurality of suction holes such that the functional sheet is held against one of the concave molding surface and the convex molding surface by a peripheral portion of the functional sheet; and while holding the functional sheet against one of the concave molding surface and the convex molding surface by the peripheral portion of the functional sheet, supplying into a cavity defined between the concave molding surface of the concave mold part and the convex molding surface of the convex mold part a molten plastic material for forming the lens body, thereby forming the lens.

3. A method as set forth in claim 1, wherein the functional sheet to be placed in position in the mold is previously shaped to match the configuration of the lens body.

4. A method as set forth in claim 2, wherein the functional sheet to be placed in position between the concave molding surface of the concave mold part and the convex molding surface of the convex mold part is previously shaped to match the configuration of the lens body.

5. A method as set forth in claim 1, wherein the suction hole is located in a portion of the molding surface within 10 mm inwardly from a line corresponding in location to a peripheral edge of the lens.

6. A method as set forth in claim 2, wherein the plurality of suction holes are located in a portion of the molding surface of said one of the concave mold part and the convex mold part within 10 mm inwardly from a line corresponding in location to a peripheral edge of the lens.

7. A method as set forth in claim 2, wherein the plurality of suction holes open in the concave molding surface of the concave mold part.

8. A method as set forth in claim 1, wherein the suction hole defines an opening having a diameter of about 0.1 to about 1.0 mm in the molding surface of the mold.

9. A method as set forth in claim 2, wherein the plurality of suction holes each define an opening having a diameter of about 0.1 to about 1.0 mm in the molding surface of said one of the concave mold part and the convex mold part.

10. A method as set forth in claim 1, wherein the mold is provided with an O-ring between mold components thereof for preventing outside air from entering the suction hole.

11. A method as set forth in claim 2, wherein the mold is provided with an O-ring between mold components thereof for preventing outside air from entering each of the plurality of suction holes.

12. An apparatus for manufacturing a lens having a lens body integral with a functional sheet on one side thereof, the apparatus comprising:

a mold configured to perform an insert molding process to form the lens, the mold including a molding surface configured to receive the functional sheet as an insert in position and a molten plastic material for forming the lens body; and a suction hole provided in the mold and configured to apply suction force sufficient to hold the functional sheet and to hold the functional sheet against the molding surface by a peripheral portion of the functional sheet by suction therethrough.

13. An apparatus for manufacturing a lens having a lens body integral with a functional sheet on one side thereof, the apparatus comprising:

a mold configured to perform an insert molding process to form the lens, the mold including a concave mold part having a concave molding surface and a convex mold part having a convex molding surface, the concave molding surface having a curvature equal to a curvature of the lens, the convex molding surface having a curvature equal to a curvature of the lens, one of the concave molding surface and the convex molding surface being configured to receive the functional sheet as an insert in position; and a plurality of suction holes provided in one of the concave molding surface and the convex molding surface, and configured to apply suction force sufficient to hold the functional sheet and to hold the functional sheet against said one of the concave molding surface and the convex molding surface by a peripheral portion of the functional sheet by suction therethrough, wherein the concave molding surface and the convex molding surface together define a cavity therebetween for receiving a molten plastic material for forming the lens body.

* * * * *